Feb. 28, 1939.  C. A. OLSEN  2,148,912
MEASURING AND PRESSING MACHINE
Filed April 24, 1936  9 Sheets-Sheet 1
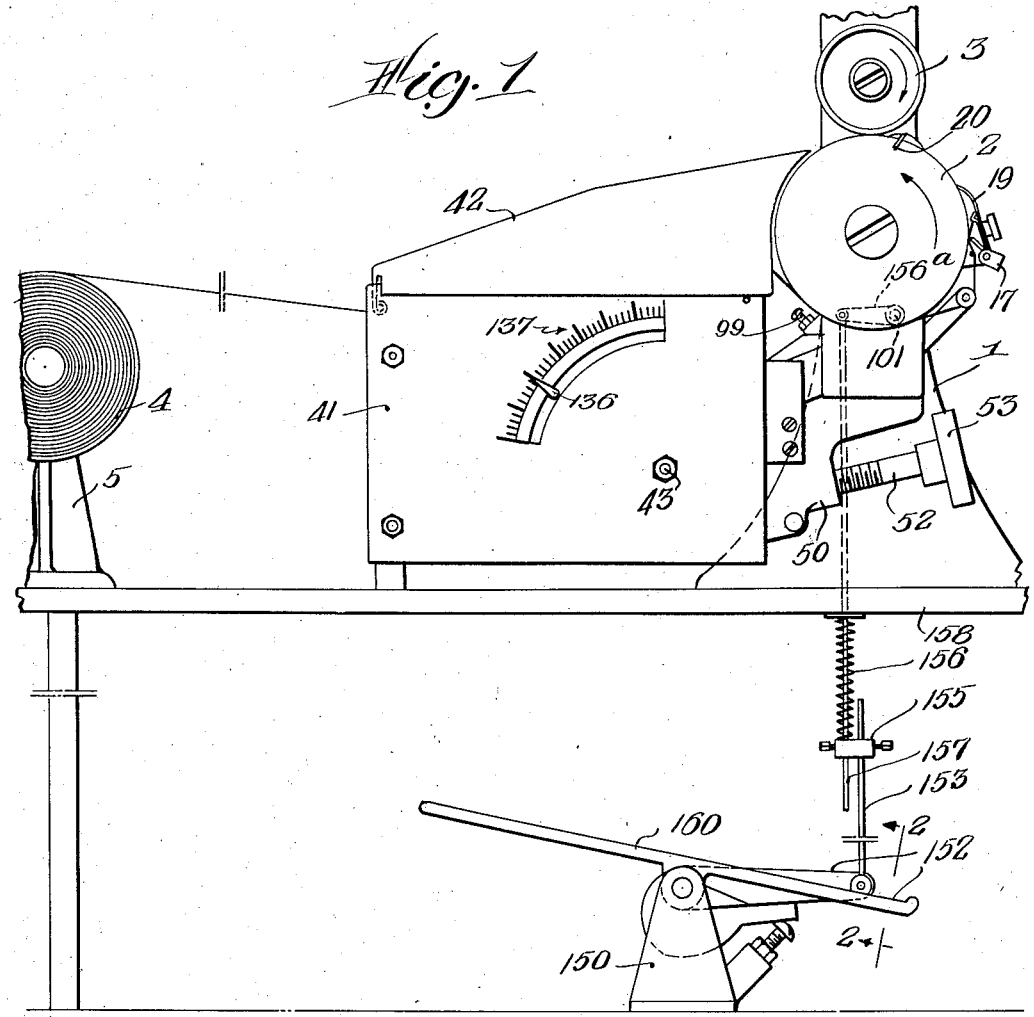
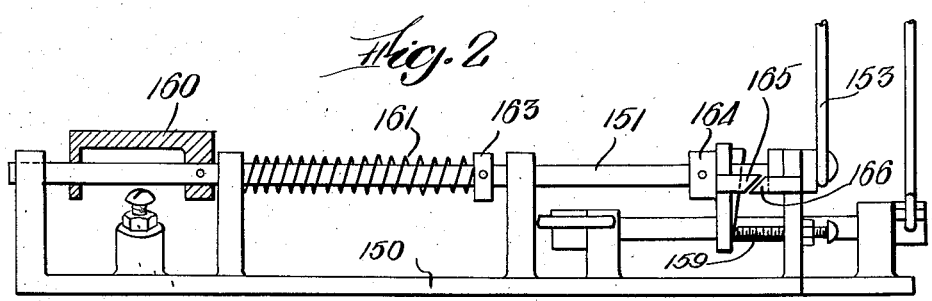
Inventor
Carl A. Olsen
By Roberts, Cushman & Woodbury
Attys.

Feb. 28, 1939.  C. A. OLSEN  2,148,912
MEASURING AND PRESSING MACHINE
Filed April 24, 1936   9 Sheets-Sheet 2
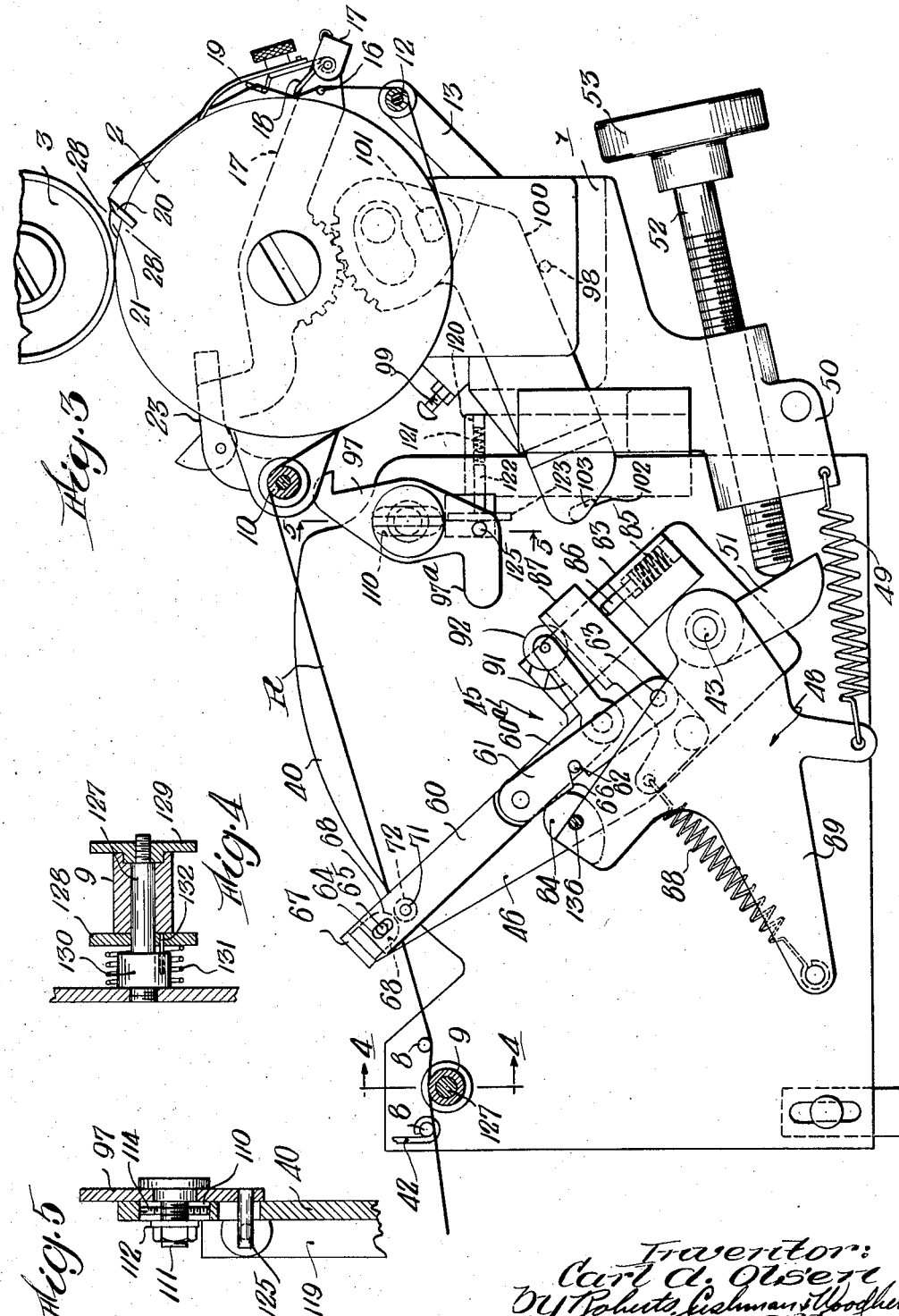

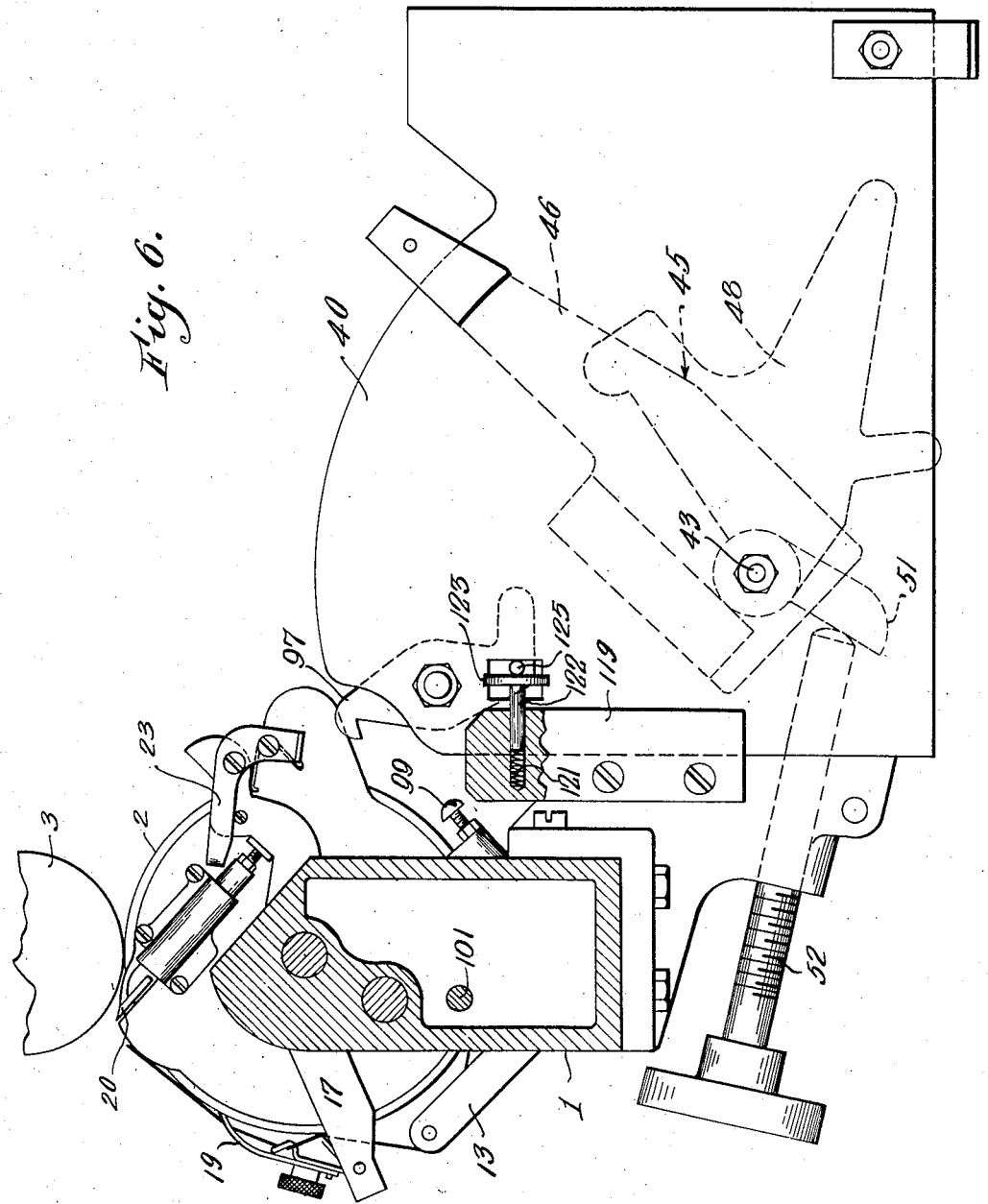

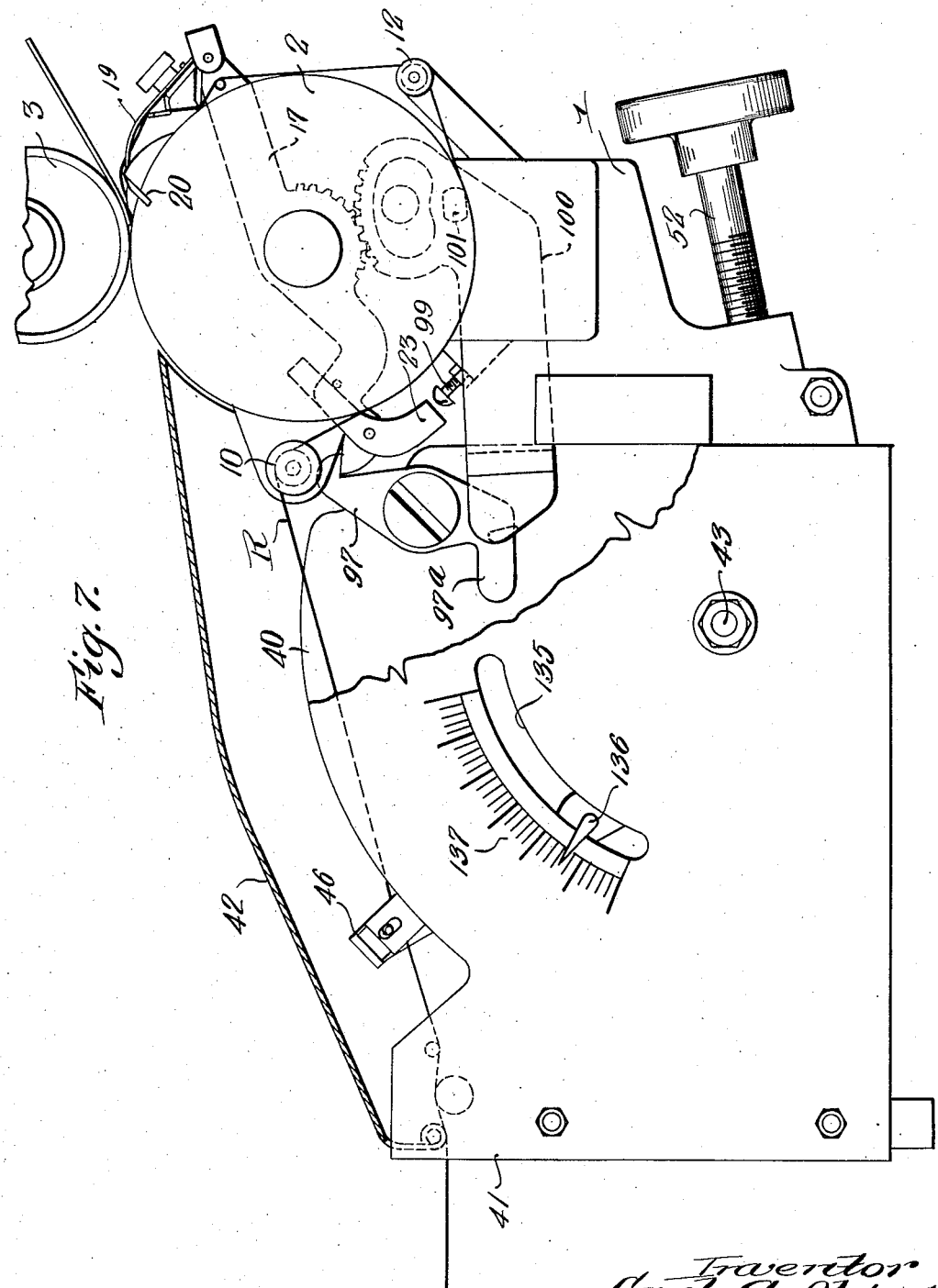

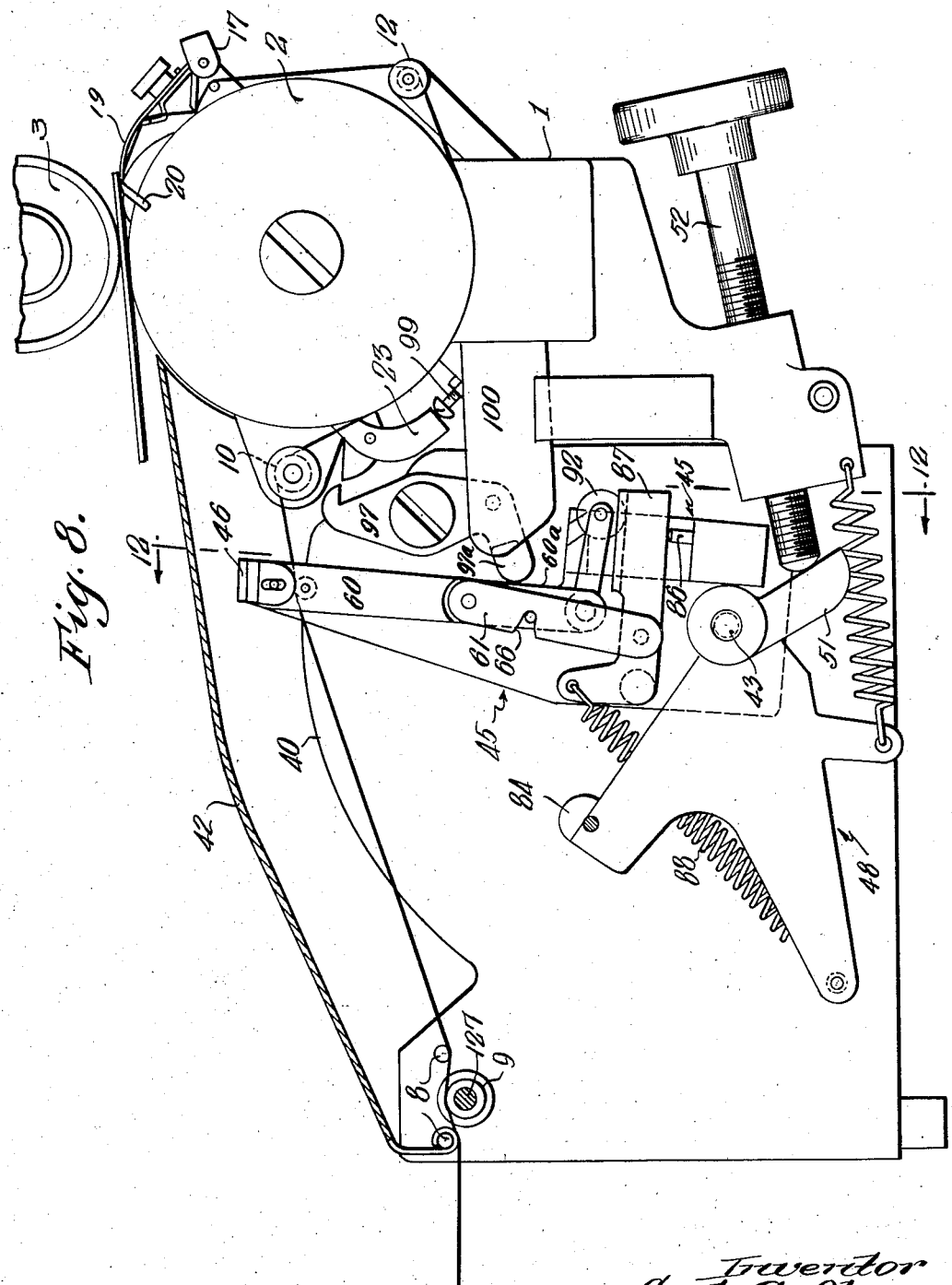

Feb. 28, 1939.                C. A. OLSEN                2,148,912
                      MEASURING AND PRESSING MACHINE
                       Filed April 24, 1936    9 Sheets-Sheet 6
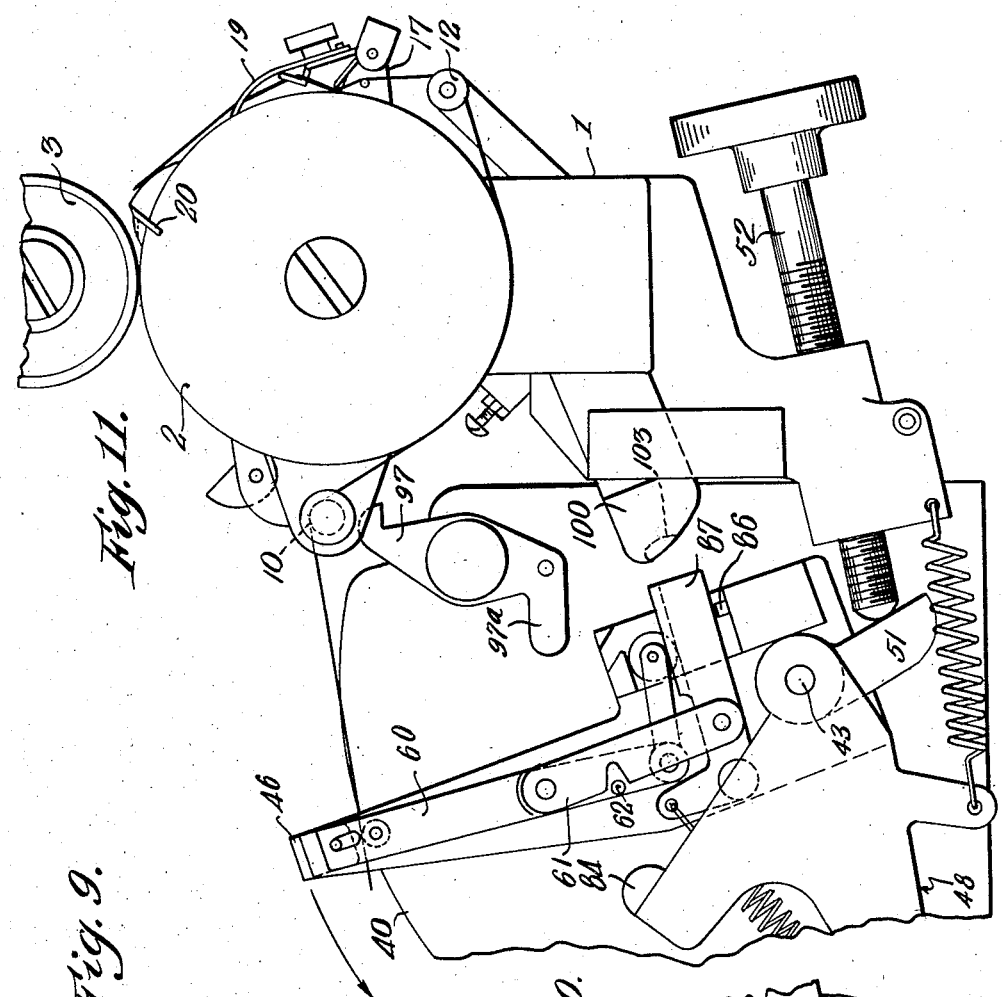
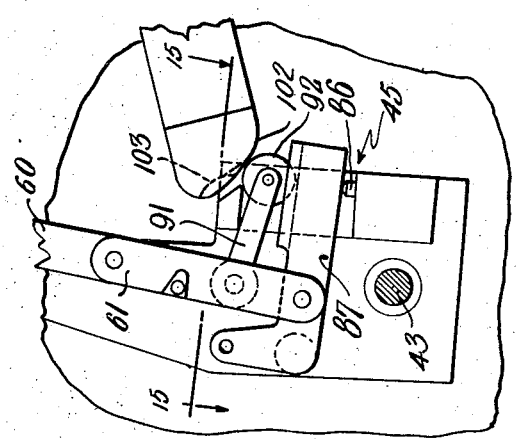
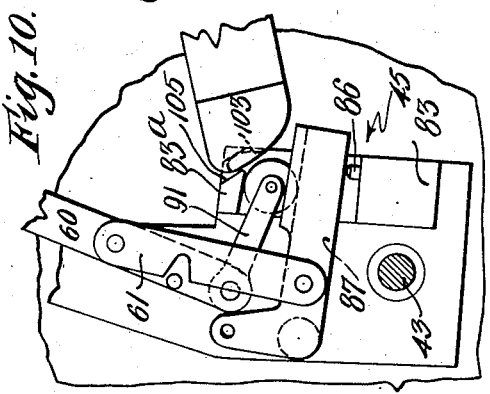

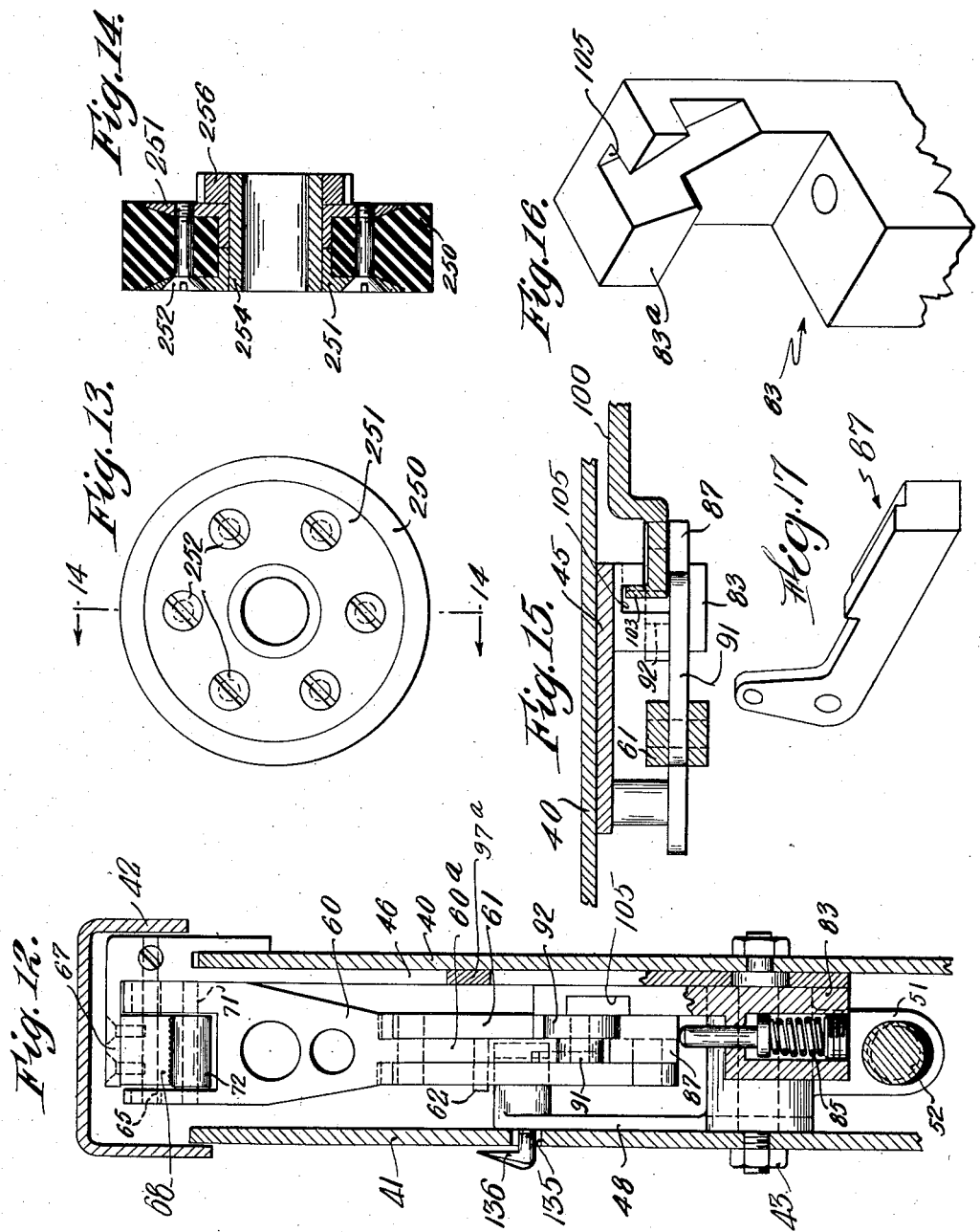

Feb. 28, 1939.　　　　C. A. OLSEN　　　　2,148,912
MEASURING AND PRESSING MACHINE
Filed April 24, 1936　　9 Sheets-Sheet 8
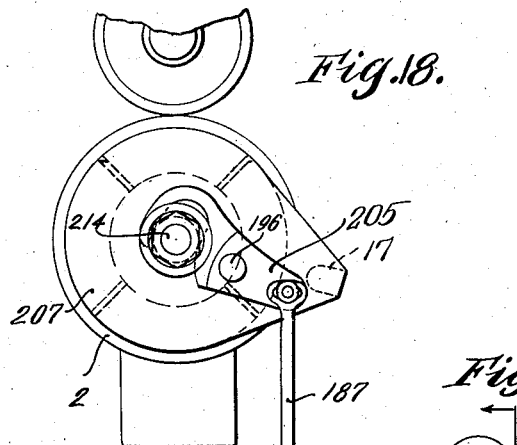
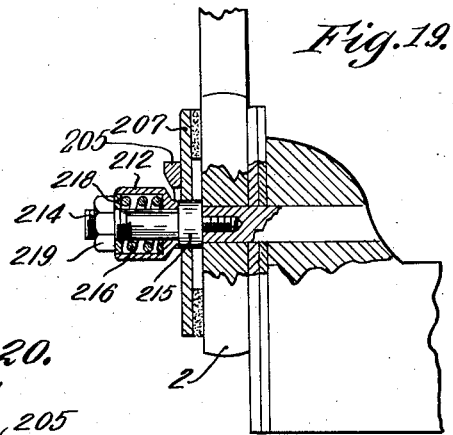
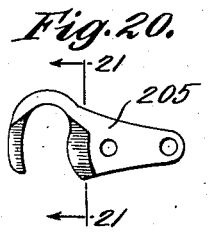
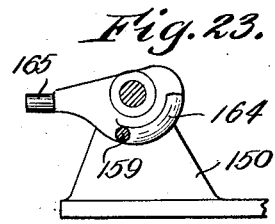
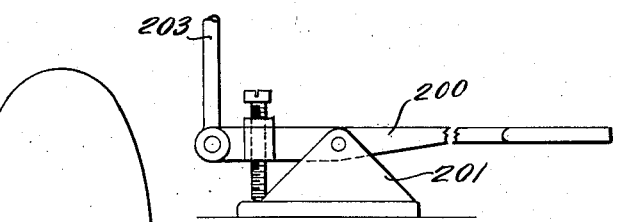
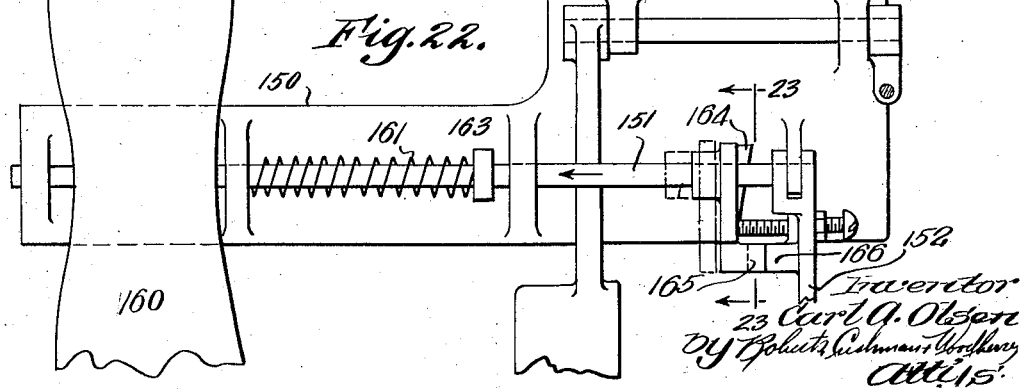

Feb. 28, 1939.  C. A. OLSEN  2,148,912
MEASURING AND PRESSING MACHINE
Filed April 24, 1936  9 Sheets-Sheet 9
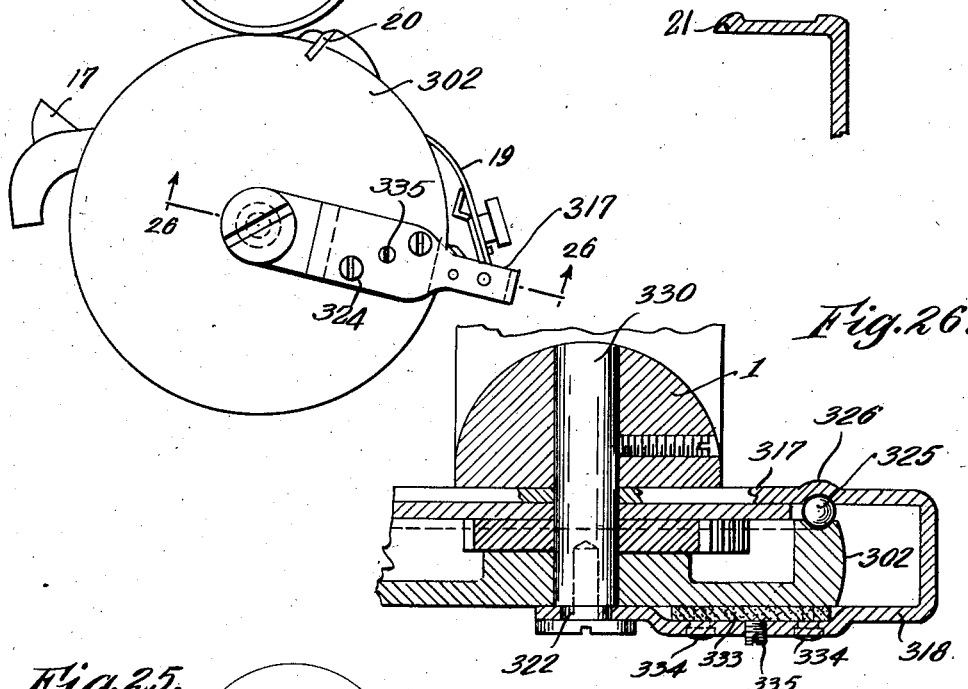

Patented Feb. 28, 1939

2,148,912

UNITED STATES PATENT OFFICE 2,148,912

MEASURING AND PRESSING MACHINE

Carl A. Olsen, Lynn, Mass., assignor to Excel Taping Machine Co., Lynn, Mass., a corporation of Massachusetts Application April 24, 1936, Serial No. 76,222

25 Claims. (Cl. 12—51)

This invention relates to a tape or strip cutting device and particularly to such a device associated with a taping machine. In some respects the present invention is an improvement upon taping machines of the character disclosed in United States Patent No. 1,787,138 to Leland K. Butler and my United States Patent No. 1,801,972.

Machines of the character disclosed in these prior patents are particularly adapted to press adhesively coated tape into engagement with sheet articles, such as portions of shoe uppers, and such machines were provided with manually controllable cutters permitting the severing of the applied section of tape from the main tape run. In practice the manual control of such cutting means affords reasonably satisfactory results, particularly for such purposes as heel seam reinforcement, where the exact length of the reinforcing tape is not a matter of especial importance. Due to the rapidity with which the tape advances between the presser rolls of a machine of this character, it is practically impossible for the operator manually to cut the tape to an exactly determined length. Such accurate cutting of tape is highly desirable, for example, when eyelet stays are being applied either to vamps or shoe linings.

The present invention is particularly effective in permitting the accurate cutting of tape sections of predetermined length as the same are being applied to sheet articles, also permitting selective variation in the lengths of such severed sections when desired. Thus the machine is especially advantageous in facilitating the mechanical application of eyelet stays. Eyelet stays have commonly been separately cut and manually applied, and operatives have often applied the stays in nonuniform adhesive engagement with the linings or uppers. For example, the ends of a stay might be firmly pressed in place but with an indifferent attachment of the mid-portion of the stay with the corresponding part of the upper.

The present invention permits the rapidity and uniformity of adhesive application which is characteristic of machine operation, the machine being controllable to conform to the speed of the individual operator in feeding successive sheet articles to the presser mechanism.

To permit these desirable results the tape feeding and advancing means is preferably arranged so that a measuring arm may advance with a run of tape, this measuring arm being provided with gripping means to engage the advancing tape run. At the forward end of its path the measuring member operates suitable instrumentalities to cause the cutter automatically to be actuated and to release the gripping means, whereupon the measuring arm automatically returns to the opposite or rear end of its path, at which point the gripping means again automatically engages a portion of the tape run so that the measuring member may repeat its advance movement through a path of determined length. The operation of the cutter is synchronized with the retrograde movement of the tape guide in the general manner disclosed in the above-identified patents, the tape guide thus being effective in interrupting the advance movement of the tape and causing actuation of the cutter.

Preferably each cycle of operation may be manually initiated by suitable control mechanism which is effective in advancing the guide to its normal operative position and thus causing the tape advancing means to direct the tape through the guide to the presser means. When the guide is manually advanced in this manner a spring may be stressed and the guide may be locked in its normal operative position by suitable locking means. When the measuring member reaches the advanced end of its path it releases the locking means to permit retraction of the guide and consequent interruption of tape movement and actuation of the cutter, the energy for this purpose being received from the stressed spring. Since this manual operation may normally be repeated by the operator of the machine a great many times during the course of a day's work, I have provided assist mechanisms to aid the manual movement and particularly to supply part of the energy required to compress the spring at the beginning of each cycle of operation.

While an important aspect of the present invention is the provision of an automatic cutting device in combination with a taping machine of the character disclosed in the above-identified patents, the provision of measuring and cutting means of this character is believed to be of generic significance, as such means might be employed without pressing adhesive tape against a sheet article or the like. Accordingly a measuring and cutting device of this type is therefore believed to have a wide range of utility and to be capable of use with a variety of strand and sheet materials. For purposes of convenience in nomenclature the term "tape" as employed herein, unless it may be clearly indicated otherwise by the context, shall be construed to apply generically to strips, webs, sheets, or ribbons of textile or other sheet material, or to strands of such materials.

In the accompanying drawings:

Fig. 1 is a side elevation of a machine constructed in accordance with this invention, parts thereof being broken away;

Fig. 2 is a section indicated by line 2—2 of Fig. 1;

Fig. 3 is a side elevation of the principal operating parts of the machine with certain cover plates removed;

Figs. 4 and 5 are sections indicated respectively by lines 4—4 and 5—5 of Fig. 3;

Fig. 6 is a vertical sectional view of the machine with parts broken away;

Fig. 7 is a side elevation similar to Fig. 3, but with a portion of the covering plates shown and portions thereof broken away, and with certain parts shown in different positions;

Fig. 8 is a similar view with certain operating parts shown in other positions;

Figs. 9 and 10 are elevational details of certain parts of the measuring mechanism occupying successive positions which they attain during the operating cycle;

Fig. 11 is a broken side elevation of a part of the mechanism shown in Fig. 3, but with the parts disposed in still another position;

Fig. 12 is a section indicated by line 12—12 of Fig. 8;

Fig. 13 is a side elevation of an optional form of presser roll;

Fig. 14 is a section on line 14—14 of Fig. 13;

Fig. 15 is an enlarged sectional detail indicated by line 15—15 of Fig. 9;

Fig. 16 is a broken perspective detail view of one part of the machine;

Fig. 17 is a similar view of another part;

Fig. 18 is a side elevation, somewhat diagrammatic in character, illustrating an optional control arrangement for the machine;

Fig. 19 is an elevational view of a part of the end of the machine shown in Fig. 18, parts being broken away and shown in section;

Fig. 20 is an elevational detail of one part of the machine shown in Fig. 18;

Fig. 21 is a section on line 21—21 of Fig. 20;

Fig. 22 is a plan view of the pedal mechanism which is shown in Fig. 2;

Fig. 23 is a section on line 23—23 of Fig. 22;

Fig. 24 is an end elevation of a portion of a machine provided with an optional type of assist mechanism;

Fig. 25 is a vertical sectional view of a portion of such a machine;

Fig. 26 is a section indicated by line 26—26 of Fig. 24;

Fig. 27 is a sectional detail of a portion of such a machine; and

Fig. 28 is an enlarged section indicated by line 28—28 of Fig. 3.

The accompanying drawings illustrate a typical application of the present invention, whereby the improved cutting and measuring device is embodied in combination with a taping machine of the character disclosed in the above-identified prior patents. For convenience of description such a taping machine will first be briefly described, it being understood that the details of construction and operation thereof are fully disclosed and described in the above-identified patents. Such a machine comprises a frame 1, provided with suitable driving means (not shown herein) to rotate a lower presser roll 2 and a cooperating upper roll 3 at approximately the same peripheral speeds, the upper roll preferably having a slightly lower peripheral speed to offset the tension imposed upon the tape by the various instrumentalities which will be described.

The tape is supplied from a tape roll 4 mounted on a bracket 5 at the rear of the machine. The tape may be adhesively coated upon one surface, and may conveniently be formed of sized textile material, although a machine of this character may be also employed with paper tape, if desired. From the roll 4 the tape passes beneath snubber pins 8 and over roll 9 (Fig. 3) to an idler roll 10 which is disposed close to and at the rear of the lower presser roll 2. Between the rolls 9 and 10 there is a tape run R of substantial length which is of especial significance, as will be apparent from further description of the measuring and cutting mechanism.

From the roll 10 the tape passes downwardly about the lower part of presser roll 2, being engageable with a portion of the periphery thereof, then extending into engagement with a pin or small roller 12 mounted on the end of a fixed arm 13 in the general manner disclosed in the above-identified patents. From the roll 12 the tape extends over a pin 16 on the tape guide supporting arm 17. A sheet metal tape guide 19 is pivotally mounted on the arm 17 and is provided with a toothed detent member or tape catch 18, which prevents rearward movement of the tape. The tape then passes through a slot in the tape guide 19 so that its end portion may be directed to the bite of rolls 2 and 3.

A cutter 20 is disposed adjoining the bite of the rolls in the manner particularly illustrated in Figs. 3 and 6, being of the general character disclosed in the above-identified patents, but being located closer to the bite of the rolls so that even in the advance position of the tape guide 19, the cutter is disposed substantially between the same and the bite of the rolls, as illustrated in Fig. 7. The inner guide block 21 for the cutter preferably may be slightly grooved, as shown in Fig. 28, to aid in guiding the tape to the bite of the rolls.

The cutter 20 is normally held in its retracted position, shown in Figs. 3 and 6, by spring means of the character disclosed in the above-identified patents, and an advancing finger 23 (Fig. 6) is mounted on the rear end of the tape guide support 17 to actuate the cutter in the general manner which is disclosed in those patents.

Aside from the arrangement of the grooved block 21, the snubber pins 8 and the roll 9, which will be more fully discussed, the general organization of parts which has been thus far described is of the type shown in my prior above-identified patent and the above-identified patent of Leland K. Butler.

A control mechanism, which will be more fully described, is effective in advancing the arm 17 and tape guide 19 to the normal operative position shown in Fig. 7, while the return movement of these parts is automatically effected.

In accordance with the present invention, a suitable device may be provided and preferably associated with the taping machine to assure the accurate cutting of predetermined lengths of tape. Such a device may include an upstanding supporting plate 40 (Fig. 3) extending rearwardly from the frame 1 of the taping machine. This plate may have connected thereto a cover plate 41, and a hinged metal covering hood 42 may extend over the upper edges of these plates.

A bolt assembly 43 connects the plates 40 and 41 and provides a pivotal support for a swinging measuring member, indicated generally by the numeral 45, which includes a measuring arm 46. A control member 48 is also pivoted on bolt 43. An extension 51 of member 48 is engageable with the inner end of a stop screw 52 that is threaded through boss 50 on the frame 1 and is provided with a knob-like handle 53 for manual adjustments.

The measuring member is provided with a toggle assembly, including the upper toggle arm 60 which is pivotally connected to a lower bipartite or double arm 61, the latter having a pivotal connection 63 with a bell crank 87 that is pivoted on the measuring arm. The upper end of toggle arm 60 has a small slot 64 in which the end of a pin 65, fixed to the measuring arm 46, is received. The arm 46, as shown in Fig. 12, is provided with a flange 67 provided with a depending element 68 having a corrugated lower extremity. The arm 60 is provided with a transversely disposed pin 71 upon which a small roller or rotatable sleeve 72 is mounted. When the toggle arms 60 and 61 are in locked position, such as is shown in Fig. 12, the roller 72 is pressed upwardly toward the corrugated element 68, so that the portion of the tape run R extending therebetween may be tightly gripped.

I have found it preferable to provide the roller 72 rather than a pin, since, due to the adhesive nature of the tape surface with which this part must contact, a pin sometimes results in undesirable sticking of the parts and consequently interferes with relative movement of the measuring arm and tape after the toggle assembly is unlocked.

The control member 48 is connected by a tension spring 49 to the boss 50, the spring thus tending to hold the member in the position shown, for example, in Fig. 3. A lighter spring 88 connects the member 48 to the bell crank 87 of the measuring arm assembly, thus tending to swing the arm 46 rearwardly.

The end of bell crank 87 remote from spring 88 is engaged by the upper end of a plunger 86 which is slidable in a bore in a block 83 secured to the body portion of measuring member 45. A suitable compressible spring 85 yieldably urges the plunger and the corresponding portion of the bell crank upwardly. The lower end of the bipartite arm 61 is pivotally connected to the longer arm of the bell crank 87, as shown, for example, in Fig. 3, and the upper arm 60 of the toggle assembly is provided with a depending tail portion 60a which is straddled by the similar portions of the bipartite arm 61. A pin 62 on this tail portion is receivable in a notch 66 in the arm portion 61 to limit the relative movement of the toggle arms when they are locked.

A lug 84 projects from the control member 48 and is engageable with the tail portion of arm 60, thus being effective in causing the automatic locking of the toggle arm assembly when the measuring member 45 moves to the rear end of its path. Since the pin 62 on the tail portion 60a limits the movement of the arms 60 and 61 as the assembly is locked, the lug 84 also acts as a stop limit the rearward movement of the measuring arm 46. It is thus evident that the member 48 is normally held by spring 49 in a fixed position, depending upon the adjustment of the hand screw 52, and that this position of the control member 48 determines the rearmost position of the measuring member; variation in the adjustment of the screw 52 consequently results in changing the rearmost position of the measuring member and the length of the path of the latter.

The depending tail portion 60a of toggle arm 60 has a link 91 pivotally connected thereto, the outer end of this member supporting a metal roller 92 which is movable along an upper surface of the longer arm of bell crank 87; see Fig. 12.

When the tape guide is advanced to operative posititon in the manner disclosed in the above-identified patents, the tape is brought into firm frictional engagement with the roller 2 and advances toward the bite of the rolls. Thus the tape disposed in the run R automatically advances and the measuring arm 46 starts moving with the tape run which is being gripped by the gripping means at the upper end of the arm. As the tape guide 19 is advanced toward the bite of the rolls, the opposite or rear end of the supporting arm 17 snaps into engagement with a locking latch 97, this latch being effective, as illustrated in Fig. 7, in holding the tape guide in its advanced or operative position.

As the arm 46 approaches the front end of its path, the front edge of the arm engages an extension 97a of the latch 97, thus swinging the latter in an anti-clockwise direction, as viewed in Fig. 8, so that the guide supporting arm 17 is released, whereupon spring means associated with the control mechanism, and which will be described in detail, causes the guide support 17 to swing in a clockwise direction, as viewed in Fig. 8, thus retracting the tape guide from the bite of the rolls, and causing the cutter immediately to sever the tape adjoining the bite of the rolls.

The control means for the tape guide support is of the general character disclosed and described in the above-identified patents and includes a toothed sector section upon the intermediate part of the support and a similar portion upon a swinging control member 100 (Fig. 3) that is connected to a shaft 101. A stop screw 99 limits the movement of member 23 (Fig. 6) and of the support 17 toward operative position, while a pin 98 on frame 1 (Fig. 3) limits the movement of parts 17 and 100 in the opposite direction. This mechanism is controlled by a pedal after the general manner described in the above-identified patents, such mechanism being somewhat modified, however, for the purposes of the present invention.

The block 83 on the measuring member 45 is provided with a rabbeted upper portion (Fig. 16) providing an overhanging extension 83a having a planar lower surface; while a diagonal cam groove 105 is disposed in front of this extension. The lower surface of the extension 83a is engageable by the roller 92 so that the latter is held downwardly. The rear end of the control member 100 is provided with a rounded cam-like extremity 102. This cam-like portion engages the metal roller 92, as illustrated in Fig. 9, when the latch 97 is released. A nub 103 upon the rear portion of the member 100 is thereupon engageable in a cam groove 105 on the member 45; see Figs. 10, 15 and 16. As the cam-like portion of the member 100 first engages the roller, it tends to move the same rearwardly, causing the longer arm of bell crank 87 to swing downwardly against the action of springs 85 and 88 (Fig. 9). As this movement continues, the toggle mechanism is unlocked; see Fig. 10. During the rearward movement of roller 92 it is held in engagement with member 87 by the extension 83ᵃ of part 83.

It is of particular importance to note that the operations which have just been described occur in an exceedingly short interval of time, the forwardly moving arm 46 first being effective in releasing latch 97 and the cam means 102 immediately thereafter engaging the roller 92 to start moving the toggle assembly toward its unlocked position, whereupon the nub 103 is received by the cam groove 105 before the gripping means has substantially loosened its engagement with the tape run. Then the nub 103 is momentarily effective in holding the measuring arm assembly against retrograde movement while the cam means is effective in snapping the toggle assembly past its center position to unlock the same. When the nub 103 swings downwardly out of the cam groove, the measuring arm may then move rearwardly under the control of spring 88 (Fig. 11) until stopped by the lug 84, which is also effective in again locking the toggle arm assembly. In this connection, it may be noted that the pawl 18 on the guide support 17 prevents rearward movement of the tape; accordingly, as the member 17 moves downwardly, the tape is moved out of firm engagement with the lower presser roll so that the latter does not tend to draw the tape from the tape roll 4, i. e., the tape is not moving, while the gripping means on the measuring arm is released.

In order to vary the exact position to which the tape guide 19 may advance, the latch 97 preferably is adjustably mounted. For this purpose a vertical elongate opening 110 is provided in the plate 40 (Figs. 3 and 5) and the latch 97 is provided with a pintle bolt 111 extending through the opening 110, but which has a diameter much smaller than the height of the opening. A washer 112 is associated with the bolt to prevent its movement transversely of the plate 40 and a diametrically disposed screw-threaded pin 114 is received in an internally threaded opening in the shank of the bolt, the ends of this pin normally being in engagement with the upper and lower parts of the opening 110. When it is desired to adjust the position of the latch, the bolt is removed from the plate 40 and the pin 114 is adjusted relative to the bolt, so that, when the parts are reassembled, the bolt may be disposed either lower or higher in the oblong opening 110. Thus the operating position of the tape guide 19 may be varied.

A suitable bore 120 is formed in a plate 119 connected to the frame of the machine and receives a small compression spring 121. A pin 122 having a relatively large head 123 has an end portion slidable in this bore, the head of the pin normally being urged by the spring against a small stud 125 projecting from the latch 97 (Fig. 6). Thus when the guide supporting arm 17 is moved to operative position, its end portion may snap into engagement with the latch.

As previously suggested, the arrangement of the roller 9 and pins 8 is a feature of the machine which is particularly advantageous when the measuring means is employed. Fig. 4 particularly illustrates the arrangement of the roller 9. This roller is rotatably mounted upon a pin 127, the roller being disposed between a friction washer 128 and a threaded retaining member 129. An annular flange 130 upon the pin 127 is disposed in spaced relation to washer 128 and a compression spring 131 urges the friction washer 128 against the end of roller 9. A retaining pin 132 extends from the annular member 130 to an opening in the washer so that rotation of the latter is opposed. It is thus evident that the rotation of roller 9 is retarded by the friction washer 128. As shown in Fig. 3, the snubbing pins 8 cooperate with this retarded or braking roller 9 to impose friction upon the advancing tape. Thus the tape run R is held taut to aid accurate operation of the measuring means.

In order to permit ready observation of the adjustment of the measuring means which depends upon the setting of the hand screw 52, the cover plate 41 is provided with a slot 135 (Figure 7) to receive the shank portion of a pointer 136 that is detachably mounted on member 48 and the end of which moves over a graduated scale 137 upon the plate 41. The position of this pointer is determined by the setting of the screw 52 and the position of the control member 48. As the screw is moved outwardly and the control member 48 consequently moves rearwardly, the measuring arm 46 is provided with a longer range of movement, which is indicated by the pointer 136, and accordingly there is more tape movement between successive cutting operations so that the severed sections of the tape are longer.

A machine of this character may be provided with manually controllable pedal mechanism of the general type disclosed in the above-identified patents, which, however, preferably is somewhat modified. Since the energy for operating various instrumentalities must come from this mechanism and since the mechanism is repeatedly actuated by the operator, it is highly desirable in order to avoid fatigue to arrange the mechanism so it will operate with the minimum of effort.

As shown in Figs. 1, 2 and 22, the pedal assembly is provided with a supporting frame 150 which may conveniently be located upon the floor below the frame 1 of the machine. A rotatable shaft 151 is mounted upon the frame 150 and an arm 152 is pivotally mounted on this shaft and connected to an upwardly extending link 153, the upper portion of which is received in a locking block 155. A depending link 157 also has its lower end secured in the block 155 and a compression spring 156 is disposed about this link and between the block and the lower surface of the bench 158 upon which the frame 1 of the machine rests. The control pedal 160 is fixed to the shaft 151 and a compression spring 161 is disposed between a portion of the frame 150 and a collar 163 fixed to the shaft, so that, as viewed in Figs. 2 and 21, the shaft is yieldably urged toward the right. A cam 164 (Fig. 22) is mounted upon the shaft and is provided with a cam element 165 having a beveled surface which is engageable with a correspondingly beveled surface of a cam element 166, the latter being connected to the arm 152 at the lower end of link 153.

The arm 152 and link 153 are held against movement downwardly from the normal inoperative position shown in Figs. 1 and 2 by the link 157 and arm 156ᵃ, the latter being secured to the shaft 101 which is associated with the control member 100 that is engaging stop 98. Accordingly when the operator depresses the heel portion of the pedal 160, the shaft 151 turns the cam element 165 so that its beveled surface engages the corresponding oppositely beveled surface of the element 166, the latter, however, is held against downward movement by the means just described. Thus the member 165, shaft 151 and pedal 160 are therefore moved slightly toward the right against the action of spring 161. Accordingly the member 165 is snapped downwardly past the member 166, whereupon the cam surface of member 164 is engageable with an adjustable abutment screw 159 that is mounted on the frame 150. Thereupon the operator depresses the toe portion of the pedal 160, causing the shaft 151 to move in the opposite direction. As this occurs, the upper surface of the element 165 engages the lower surface of the element 166 while the cam 164 is engaging the screw 157. Accordingly as the toe portion of the pedal is depressed, the member 166 is swung upwardly, thus moving the arm 152 and links 153 and 157 upwardly. This causes the arm 156$^a$ to oscillate the shaft 101, the latter being effective through the control member 100 in causing the guide support 17 to swing toward normal position, so that the latch 97 may snap over its end. Just after this occurs the member 165 snaps past member 166, thus interrupting further movement of the latter, while the support 17 has only a very slight return movement before it is stopped in the normal position shown in Fig. 7 by latch 97.

Obviously as the toe portion of the pedal is depressed in this manner the spring 156 is compressed. When the latch 97 is released by the measuring mechanism in the manner that has been described, the spring 156 is effective through link 157 and arm 156$^a$ in causing the control member 100 to swing the support 17 to inoperative position, thus unlocking the toggle assembly and causing actuation of the cutter in the manner which has been described. It is thus evident that the energy to unlock the toggle mechanism and to operate the cutter is stored in the spring 156 and that the operator actuates the pedal 160 to initiate a cycle of operations, whereupon the various operations in that cycle are automatically effected.

In the operation of a machine of this character, asssuming that the tape has been suitably disposed in engagement with the various rollers and with its end portion projecting slightly from the guide 19, when the operator actuates the pedal 160 in the manner just described, the guide support 17 and the guide 19 are moved to normal position, being locked in this position by the latch 97. Before or while this movement occurs, the operator may manually press the advance edge of the sheet article to be taped into adhesive engagement with the tape end. The end of the tape is then engageable by the constantly rotating presser rolls 2 and 3 and the tape is drawn into firm frictional engagement with the lower portion of the roll 2 so that it is advanced with the sheet article into the bite of the rolls. Accordingly the advanced tape is firmly pressed into adhesive engagement with the corresponding part of the sheet article.

Since the measuring arm 46 has already been locked in engagement with the tape run R, this arm automatically advances as the tape moves between the rolls. This movement continues until the front edge of arm 46 engages the extension 97$^a$ of latch 97 to release the latter, thus permitting the spring 156 to be effective in moving the member 100 downwardly, thereby moving the guide support 17 and the guide 19 out of normal operative position. As the member 100 moves downwardly, it is effective, as shown in Figs. 9 and 10, in causing the automatic unlocking of the gripping means. As the guide support starts moving downwardly, the cutter 20 is also actuated to sever the tape and the tape is released from firm engagement with the presser roll so that its advance movement is interrupted.

When the gripping means has released the arm 46 from operative engagement with the tape run, the arm is automatically returned to the rear end of its path, the exact position of this end of its path being determined by the adjustment of the hand screw 52. When the arm approaches the rear end of its path the lug 84 is effective in relocking the toggle assembly and the gripping means so that measuring mechanism is conditioned for another operating cycle which begins when the operator again actuates the pedal 160 to advance the guide support 17 to normal operative position.

It is evident that each time that the measuring arm 46 advances it moves through a path of predetermined length and that the length of this path corresponds to the length of tape which is severed at the end of each cycle of operation. Accordingly variation in the length of this path results in variation of the length of the severed tape section.

Figs. 18 to 21 illustrate an optional embodiment of the invention wherein rather than depending upon the pedal mechanism to cause movement of the guide support to operative position and to supply energy to a spring to unlock the toggle assembly and actuate the cutter, automatic clutch means may be provided for this purpose, it being understood that the general instrumentalities of the machine are similar to those previously described. A pedal 200 is pivotally mounted on a bracket 201 which is supported by the floor beneath the machine. A rearward extension of this pedal is articulated to an upwardly extended link 203, the upper end of which is loosely received in a guide tube 180 fixed to the bench 181 which supports the machine. A guide cylinder 205$^a$ is mounted upon the bench 181 and a collar 204 on a vertically movable link 187 is slidable in this cylinder. The lower end of the link 187 is engageable with the upper extremity of the link 203. An adjustable tubular member 185 is secured to the upper end of the guide cylinder, engaging a compression spring 206 which urges the collar 204 and the link 187 downwardly.

The upper end of link 187 has a loose connection with a cam hook member 205, the intermediate part of which is mounted on a pivot pin 196 which is fixed to a movable clutch plate 207 that is connected to the end of the tape guide support 17. The plate 207 is rotatable about an extension of the shaft which supports the lower presser roll 2. For this purpose a stud 214 has an end portion threaded into the extremity of the shaft and has a collar portion 215 upon which the clutch plate 207 is rotatable. A cup member 212 is disposed on the stud 214 and a compression spring 216 is disposed within the cup member, being retained in place by a washer 218 that is retained by the nut 219 at the outer end of the stud 214.

The spring 216 is effective in yieldably urging the cup inwardly so that in its normal inoperative position it engages the collar 215. The cam hook member 205 is provided with a hooklike end portion which, in the inoperative position of the parts, loosely straddles the collar 215 and the adjoining portion of the cup 212. When the pedal 200 is depressed, link 203 moves link 187 upwardly against the action of spring 206, thus swinging the cam hook member 205 about pivot 196 so that its hooked end portion has a wedge-like engagement between the beveled end of cup 212 and the outer face of the clutch plate 207. Thus the spring 216 is compressed and the friction facing upon clutch plate 207 is pressed against the outer face of the roller 2. Thus the guide support 17 and the tape guide are automatically moved toward operative position and the spring 206 is compressed. As this movement is continued the latch 97 snaps into lock position and the collar 204 engages a tubular extension of the member 185 within the upper end of cylinder 205$^a$. Thus the link 187 tends to cause the cam hook member 205 to swing about its pivot 196 relative to the clutch plate 207 so that the wedge-like hooked end of the member moves out of its operative position and the clutch means is disengaged. With this embodiment of the invention, when the measuring arm approaches the front end of its path, the latch 97 is actuated in the manner which has been described to release the guide support 17 and thereupon the spring 206 supplies the energy for retracting the support, unlocking the toggle assembly and actuating the cutter.

Figs. 13 and 14 illustrate an optional form of upper presser roll which may be employed with particular advantage in a machine of this type used for applying eyelet stays. This type of roll may have an annular rubber body portion 250 which is received between two retaining fellies 251, these fellies having outstanding flanges which are connected by screws 252 extending through openings in the rubber roller and having inwardly extending flanges, the edges of which may engage each other to define a metal lined opening at the center of the roller, this opening conveniently receiving a sleeve 254 or the like upon which a driving gear 256 of the driving mechanism is mounted. Thus the rubber of the roller is firmly supported and held in place, although the peripheral portion of the roller which engages the sheet article is yieldable and does not have any metal parts.

Another arrangement for aiding the manual operation of the machine is shown in Figs. 24 to 27 of the accompanying drawings. In accordance with this arrangement the tape guide 19 may be of the type previously described and may be mounted upon a support 317 which is generally similar to the support 17 but which is shaped to provide a U-shaped portion 318 (Fig. 26) straddling the front part of presser roll 302. The roll 302 is similar to the roll 2 except that it has a shallow peripheral groove 324 to engage a clutch ball 325. The guide 317 is pressed out as indicated by numeral 326 to provide a shallow recess 327 to engage the opposite side of the ball 325. As shown in Fig. 27, this recess is tapered in a vertical direction so that the ball is tightly engaged with the grooved portion 324 of roller 302 when it is near the lower part of this recess. Thus in effect the parts are arranged to afford a ball clutch. The outer face of the guide 317 has a pivotal mounting on the shoulder 322 of a screw secured to the fixed spindle 330 about which the roller 302 rotates. Thus the guide support is adapted to swing about the spindle and its extension. A friction plate 333 is adjustably mounted upon the outer part of the support 317 being connected thereto by clamping screws 334 and by a spacing screw 335 so that the plate may normally have a light frictional engagement with the face of the roller.

When the operator actuates the pedal mechanism to cause the support 317 to swing upwardly in the manner which has been described with reference to the support 17, the movement of the recessed portion of the support which engages ball 325 is ordinarily faster than the movement of the roller 302. Accordingly the ball 325 is wedged between the grooved portion of the roller and the recessed portion of the support, the latter being slightly stressed to press the friction plate 333 into engagement with the opposite face of the roller. Thus the support 317 has a gripping engagement with the roller and the latter tends to swing the support 317 to normal position and aids in compressing the spring 156 associated with the pedal mechanism. When the guide 317 reaches its normal operative position it engages the screw 99 as a stop and the roller 302 which is being positively driven moves relative to the support so that the engagement of the ball with the grooved portion of the roller is released, i. e., the ball tends to move into the wider part of its recess.

Obviously when the latch 97 is actuated and the spring mechanism returns the guide support to normal position, the ball 325 tends to move toward the upper or wider part of the recess so that there is no clutching effect. It is thus evident that this mechanism affords means to aid the muscular effort of the operator in compressing the spring 156 which supplies the energy for unlocking the toggle assembly and actuating the cutter 20.

While the compression of the spring in this manner requires only a slight effort, the operation is repeated so many times that assist mechanism of the type described is a distinct advantage in avoiding undue tiring of the operator.

It is evident that the present invention affords mechanism adapted accurately to cut sections of a predetermined length from tape supplied to presser rolls. Accordingly the present invention is particularly advantageous in permitting the application of accurately determined lengths of tape to sheet articles, such as shoe uppers or linings, and thus is especially useful in facilitating the mechanical application of eyelet stays. A machine of this character may be used with sized, adhesively coated tape made of textile fabric, or it may be used with adhesively coated paper tape. The fabric tape may either be applied in straight sections or in slightly curved sections when the particular design of shoe being worked upon makes this desirable.

I claim:

1. A machine of the class described comprising tape advancing means arranged to support and advance a tape run, a cutter, a movable measuring member, means adjustably to vary the length of the path of said member, said member being provided with automatic means to grip the tape run and advance therewith, means whereby the advanced member actuates the cutter and the gripping means is released, and means thereupon to return the member to the other end of its path, whereby the tape may be cut in lengths of determined extent.

2. A machine of the class described comprising a pair of tape advancing and pressing rolls, tape supplying means, said means being arranged to support a tape run, a movable measuring member, gripping means upon the member constructed and arranged so that the member may advance with the tape run, a cutter actuable by the member at the end of its advance movement, the gripping means thereupon being releasable and the measuring member thereupon returning to the opposite end of its path, said cutter being effective in cutting a section from the tape corresponding to the length of the advance movement of said measuring member.

3. A machine of the class described comprising a pair of tape advancing and pressing rolls, tape supplying means, said means being arranged to support a tape run, a movable measuring member, gripping means upon the member constructed and arranged so that the member may advance with the tape run, a cutter actuable by the member at the end of its advance movement, the gripping means thereupon being releasable and the measuring member thereupon returning to the opposite end of its path, said cutter being effective in cutting a section from the tape corresponding to the length of the advance movement of said measuring member, and means to vary the length of the path of said measuring member and consequently of the tape section severed by said cutter.

4. A machine of the class described comprising a pair of tape advancing and pressing rolls, tape supplying means, said means being arranged to support a tape run, a movable measuring member, gripping means upon the member constructed and arranged so that the member is advanced with the tape run, a cutter actuable by the member at the end of its advance movement, the gripping means thereupon being releasable and the measuring member thereupon returning to the opposite end of its path, said cutter being effective in cutting a section from the tape corresponding to the length of the advance movement of said measuring member, and manually controllable tape feeding means to advance the severed end of the tape to the rolls whereupon the measuring member is again automatically advanced.

5. A machine of the class described comprising tape feeding and advancing means, a cutter, a measuring arm movable along a path of predetermined length, gripping means supported by the arm and actuable so that the arm may advance with the tape, the cutter being actuable by the arm and the gripping means thereupon being releasable, the arm then being movable back to the opposite end of its path, and the gripping means thereupon being automatically actuated to regrip the tape.

6. A machine of the class described comprising tape feeding and advancing means, control mechanism operable to cause said means to advance the tape or to interrupt the movement of the tape, a cutter automatically actuable when said mechanism operates to interrupt the tape movement, a measuring member movable along a path of predetermined length, a toggle assembly carried by said member and cooperating therewith when locked to provide means to grip the advancing tape so that the member may advance with the tape, said member at the end of its advance movement actuating said control mechanism to cause the cutter to cut the tape and to interrupt tape movement, the toggle assembly being automatically unlocked to release the gripping means as the tape movement is interrupted, the measuring member then being returnable to the opposite end of its path.

7. A machine of the class described comprising tape feeding and advancing means, control mechanism operable to cause said means to advance the tape or to interrupt the movement of the tape, a cutter automatically actuable when said mechanism operates to interrupt the tape movement, a measuring member movable along a path of predetermined length, a toggle assembly carried by said member and cooperating therewith when locked to provide means to grip the advancing tape so that the member may advance with the tape, said member at the end of its advance movement actuating said control mechanism to cause the cutter to cut the tape and to interrupt tape movement, said mechanism unlocking the toggle assembly at the advance end of the path of the measuring member thus releasing the gripping means, and means to cause the measuring member to return to the opposite end of the path and automatically to relock the toggle assembly.

8. A machine of the class described comprising tape feeding and advancing means, control mechanism operable to cause said means to advance the tape or to interrupt the movement of the tape, a cutter automatically actuable when said mechanism operates to interrupt the tape movement, a measuring member movable along a path of predetermined length, a toggle assembly carried by said member and cooperating therewith when locked to provide means to grip the advancing tape so that the member may advance with the tape, said gripping means including a corrugated part fixed to the measuring member and a roller carried by a toggle arm and movable into juxtaposition to said part when the toggle assembly is locked thereby to grip the tape between the roller and said part, said member at the end of its advance movement actuating said control mechanism to cause the cutter to cut the tape and to interrupt tape movement, the toggle assembly being automatically unlocked to release the gripping means as the tape movement is interrupted, the measuring member then being returnable to the opposite end of its path.

9. A machine of the class described comprising tape feeding and advancing means, control mechanism operable to cause said means to advance the tape or to interrupt movement of the tape, a cutter automatically actuable when said mechanism operates to interrupt the tape movement, a measuring member movable over a path of predetermined length, gripping means supported by said member and arranged when locked to grip the advancing tape so that the member may advance with the tape, and means to unlock the gripping means at the advance end of the movement of said member, said member being arranged to cause said control mechanism to operate the cutter and to interrupt the movement of the tape when the member is at the advance end of its path, a control member, resilient means connecting the measuring member and control member and tending to move the measuring member away from its advance position, means adjustable to vary the position of the control member, said control member being provided with means to limit the retrograde movement of the measuring member and to relock the gripping means, whereby the length of the predetermined path of the measuring member may be varied by adjusting the position of the control member.

10. Machine of the class described comprising tape feeding and advancing means, control mechanism operable to cause said means to advance the tape or to interrupt the movement of the tape, a cutter automatically actuable when said mechanism operates to interrupt tape movement, a measuring member movable along a path of predetermined length, a toggle assembly carried by said member and cooperating therewith when locked to provide means to grip the advancing tape so that the member may advance with the tape, said member at the end of its advance movement actuating said control mechanism to cause the cutter to cut the tape and to interrupt tape movement, a control member providing means to limit the retrograde movement of the measuring member and to relock the toggle assembly, the control member being adjustable to vary the length of said predetermined path.

11. A machine of the class described comprising tape feeding and advancing means, control mechanism operable to cause said means to advance the tape or to interrupt the movement of the tape, a cutter automatically actuable when said mechanism operates to interrupt the tape movement, a measuring member movable along a path of predetermined length, a toggle assembly carried by said member and cooperating therewith when locked to provide means to grip the advancing tape so that the member may advance with the tape, said member at the end of its advance movement actuating said control mechanism to cause the cutter to cut the tape and to interrupt tape movement, the toggle assembly being automatically unlocked to release the gripping means as the tape movement is interrupted, the measuring member then being returnable to the opposite end of its path, said control mechanism being manually operable to cause said means to advance the tape and being automatically operable to interrupt the movement of the tape and to cause automatic actuation of said cutter.

12. A machine of the class described comprising tape advancing means, a measuring member movable over a predetermined path, a cutter, tape gripping means supported by said member and arranged so that the member is advanced by the advancing tape, said cutter being actuable by said member at the advance end of its path, and control mechanism to cause said first-named means to advance the tape and to cause interruption of the movement of the tape and substantially simultaneous actuation of the cutter, said control mechanism being manually actuable to cause the advance movement of tape and being automatically actuable by said member to interrupt tape movement and actuate the cutter.

13. A machine of the class described comprising tape advancing means, a measuring member movable over a predetermined path, a cutter, tape gripping means supported by said member and arranged so that the member is advanced by the advancing tape, said cutter being actuable by said member at the advance end of its path, control mechanism to cause said first-named means to advance the tape and to cause interruption of the movement of the tape and substantially simultaneous actuation of the cutter, said control mechanism being manually actuable to cause the advance movement of tape and being automatically actuable by said member to interrupt tape movement and actuate the cutter, the control mechanism including a manually movable part, a tape guide, said part being movable to advance the guide so that the tape may be advanced by said first-named means, locking means to hold said guide in advanced position, a spring stressed by said movement of said part, the automatic actuation of said control mechanism causing the release of said locking means, whereupon the spring is effective in retracting the guide and causing actuation of the cutter.

14. Control mechanism of the class described comprising a support, a shaft rotatable and longitudinally movable on the support, a pedal on the shaft, a spring urging the shaft in one longitudinal direction, a cam on said shaft, a beveled element on the shaft, a swinging arm, a second beveled element on the arm, a link connected to the arm, locking means to hold the link in one position, a fixed member on the support to engage said cam, the pedal being movable to swing the shaft in one direction to cause the engagement of the beveled elements so that the shaft moves longitudinally until the elements snap out of engagement, the pedal then being movable in the opposite direction so that the first-named beveled element actuates the second beveled element to move said link to locked position, the cam then engaging the cooperating fixed member so that the first beveled element may return to its original position relative to the second element.

15. A machine of the class described comprising tape advancing means, a cutter, a measuring mechanism automatically actuating said cutter to sever the tape after a predetermined length of the same has been advanced, and control means to initiate and interrupt movement of the tape by said first-named means, said control means being manually controllable to cause initiation of said tape movement and being automatically actuable by said mechanism to interrupt said movement, the control means including a spring, a part manually movable to initiate tape movement and to stress said spring, locking means to hold the part so that the spring is stressed, said locking means being automatically releasable by said mechanism, whereby the spring retracts said part, and assist mechanism interconnecting the tape advancing means and the control means so that the manual movement of the part to stress the spring is mechanically aided.

16. A machine of the class described comprising tape advancing means, a cutter, a measuring mechanism automatically actuating said cutter to sever the tape after a predetermined length of the same has been advanced, and control means to initiate and interrupt movement of the tape by said first-named means, said control means being manually controllable to cause initiation of said tape movement and being automatically actuable by said mechanism to interrupt said movement, the control means including a spring, a part manually movable to initiate tape movement and to stress said spring, locking means to hold the part so that the spring is stressed, said locking means being automatically releasable by said mechanism whereby the spring retracts said part, and assist mechanism interconnecting the tape advancing means and the control means so that the manual movement of the part to stress the spring is mechanically aided, said assist mechanism including a one-way clutch which is automatically engaged upon initial manual movement of the part and which is automatically disengaged when the tape movement is initiated.

17. A machine of the class described comprising tape advancing means including a pair of juxtaposed presser rolls, a tape guide movable to an operating position to engage the tape with one of said rolls and thus to cause the movement of tape through the bite of the rolls, a cutter automatically actuable to sever tape as the guide is retracted to interrupt tape movement, and measuring mechanism to cause retraction of the guide and consequent severing of the tape after the tape has advanced a predetermined distance.

18. A machine of the class described comprising tape advancing means including a pair of juxtaposed presser rolls, a tape guide movable to an operating position to engage the tape with one of said rolls and thus to cause the movement of tape through the bite of the rolls, a cutter automatically actuable to sever tape as the guide is retracted to interrupt tape movement, control mechanism to advance said guide to operating position and to retract it therefrom, said control mechanism including a manually movable part to advance said guide to operable position, a spring stressed by the movement of said part and locking means to hold the guide in operable position, and means to release said locking means whereby the spring automatically retracts the guide to interrupt tape movement and actuate the cutter.

19. A machine of the class described comprising tape advancing means including a pair of juxtaposed presser rolls, a tape guide movable to an operating position to engage the tape with one of said rolls and thus to cause the movement of tape through the bite of the rolls, a cutter automatically actuable to sever tape as the guide is retracted to interrupt tape movement, control mechanism to advance said guide to operating position and to retract it therefrom, said control mechanism including a manually movable part to advance said guide to operable position, a spring stressed by the movement of said part and locking means to hold the guide in operable position, means to release said locking means whereby the spring automatically retracts the guide to interrupt tape movement and actuate the cutter, and assist mechanism whereby the manual movement of said part and the stressing of the spring is mechanically aided by the movement of said presser rolls.

20. A machine of the class described comprising tape advancing means including a pair of juxtaposed presser rolls, a tape guide movable to an operating position to engage the tape with one of said rolls and thus to cause the movement of tape through the bite of the rolls, a cutter automatically actuable to sever tape as the guide is retracted to interrupt tape movement, control mechanism to advance said guide to operating position and to retract it therefrom, said control mechanism including a manually movable part to advance said guide to operable position, a spring stressed by the movement of said part and locking means to hold the guide in operable position, measuring mechanism having a measuring member to release said locking means so that the spring is effective in retracting the guide to interrupt tape movement and to cause actuation of the cutter.

21. A machine of the class described comprising tape advancing means including a pair of juxtaposed presser rolls, a tape guide movable to an operating position to engage the tape with one of said rolls and thus to cause movement of tape through the bite of the rolls, a cutter automatically actuable to sever tape as the guide is retracted to interrupt tape movement, control mechanism to advance said guide to operating position and to retract it therefrom, said control mechanism including a manually movable part to advance said guide to operable position, a spring stressed by the movement of said part and locking means to hold the guide in operable position, measuring mechanism having a measuring member to release said locking means so that the spring is effective in retracting the guide to interrupt tape movement and to cause actuation of the cutter, and assist mechanism including ball-clutch means engageable upon initial manual actuation of said part to cause the presser rolls mechanically to aid manual movement of the part and stressing of the spring, said clutch means being disengageable as the tape movement is initiated.

22. A machine of the class described comprising a pair of juxtaposed presser rolls, a tape guide to direct tape to the bite of the rolls, a cutter adjoining the bite of the rolls and substantially between said bite and the guide, a cutter guide block adjoining the bite of the rolls, said block being grooved to aid the straight-line movement of the tape to the rolls.

23. A machine of the class described comprising tape advancing means including a pair of juxtaposed presser rolls, a tape guide movable to an operating position to engage the end of a tape with one of said rolls and thus to cause the movement of the tape through the bite of the rolls, a cutter automatically actuable to sever the tape as the guide is retracted to interrupt tape movement, control mechanism to advance said guide to operating position and to retract it therefrom, said control mechanism including a manually movable part for advancing said guide to operating position, and measuring mechanism for causing the operation of the control mechanism to effect retraction of the guide and automatic actuation of said cutter, said measuring mechanism being arranged to measure the length of the tape section between said end of the tape and the portion thereof severed by the cutter, said measuring mechanism being adjustable to permit variation in the lengths of the tape sections which are thus automatically severed.

24. A machine of the class described comprising tape advancing means including a pair of juxtaposed presser rolls, a tape guide movable to an operating position to engage the end of a tape with one of said rolls and thus to cause the movement of the tape through the bite of the rolls, a cutter automatically actuable to sever the tape as the guide is retracted to interrupt tape movement, control mechanism to advance said guide to operating position and to retract it therefrom, said control mechanism including a manually movable part for advancing said guide to operating position, and measuring mechanism for causing the operation of the control mechanism to effect retraction of the guide and automatic actuation of said cutter, said measuring mechanism including a measuring member arranged to be secured to the tape moving toward said rolls, so that said member advances in response to a corresponding movement of the tape, said member actuating the control mechanism to effect retraction of the guide and automatic actuation of the cutter, the member being arranged so that the length of its advance movement corresponds to the length of the tape section between said end of the tape and the portion thereof severed by the cutter, said measuring mechanism being adjustable to permit variation in the length of the path of said member and the consequent lengths of the severed tape sections.

25. A machine of the class described comprising presser means to apply tape in adhesive engagement with a sheet article, tape supplying means, a cutter, a measuring member arranged automatically to be secured to the tape and to advance in response to movement of the tape toward the presser means, a manually actuable control means to initiate feeding of the tape to the presser means and consequent movement of the measuring member, the latter being effective in automatically causing actuation of the cutter when the tape has advanced a predetermined amount, the measuring member being automatically releasable from the tape at the end of its advance path, and means thereupon automatically to return the measuring member to the opposite end of its path.

CARL A. OLSEN.